US012583787B2

(12) United States Patent
    Barres

(10) Patent No.: US 12,583,787 B2
(45) Date of Patent: Mar. 24, 2026

(54) TRANSPARENT SUBSTRATE COATED WITH A STACK OF THIN LAYERS

(71) Applicant: SAINT-GOBAIN GLASS FRANCE, Courbevoie (FR)

(72) Inventor: Thomas Barres, Asnieres sur Seine (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 95 days.

(21) Appl. No.: 18/264,007

(22) PCT Filed: Feb. 9, 2022

(86) PCT No.: PCT/FR2022/050232
    § 371 (c)(1),
    (2) Date: Aug. 2, 2023

(87) PCT Pub. No.: WO2022/171956
    PCT Pub. Date: Aug. 18, 2022

(65) Prior Publication Data
    US 2024/0101469 A1      Mar. 28, 2024

(30) Foreign Application Priority Data

Feb. 10, 2021    (FR) ...................................... 2101265

(51) Int. Cl.
    C03C 17/36        (2006.01)
    E06B 3/67         (2006.01)
(52) U.S. Cl.
    CPC ........ C03C 17/366 (2013.01); C03C 17/3618 (2013.01); C03C 17/3626 (2013.01);
    (Continued)

(58) Field of Classification Search
    CPC .............. C03C 17/366; C03C 17/3644; C03C 17/3681; B32B 17/1022; B32B 17/10229; G02B 5/281; G02B 5/282; G02B 5/285
    See application file for complete search history.

(56) References Cited

U.S. PATENT DOCUMENTS 6,589,658 B1 *   7/2003   Stachowiak ............ C03C 17/36
                                                    428/704
2005/0026002 A1 *   2/2005   Hartig ................. C03C 17/3639
                                                    204/192.12
                        (Continued)

FOREIGN PATENT DOCUMENTS

WO      WO 2007/101964 A1      9/2007
WO      WO 2012/127162 A1      9/2012
                        (Continued)

OTHER PUBLICATIONS

International Search Report as issued in International Patent Application No. PCT/FR2022/050232, dated May 23, 2022.

*Primary Examiner* — Z. Jim Yang
(74) *Attorney, Agent, or Firm* — Cushman Partners, LLC

(57)            ABSTRACT
A transparent substrate coated with a stack of thin layers includes, from the substrate, a bottom dielectric coating including a wetting layer, which is, for example, a ZnO-based layer, a silver-based functional metal layer and a top dielectric coating, each dielectric coating including several dielectric layers, wherein the bottom dielectric coating includes a series of at least three dielectric layers having increasing refractive indices, the index difference between the three layers being at least 0.15; the top dielectric coating including a series of at least two layers having decreasing refractive indices. The Ug coefficient is kept at low values (from 0.22 to 0.31 Btu/hft²F) whereas the solar factor SHGC is maximized (from 0.720 to 0.757).

20 Claims, 1 Drawing Sheet

(52) U.S. Cl.
    CPC ...... *C03C 17/3644* (2013.01); *C03C 17/3681*
                (2013.01); *E06B 3/6715* (2013.01)

(56) References Cited

U.S. PATENT DOCUMENTS

| | | | |
|---|---|---|---|
| 2006/0121290 A1* | 6/2006 | Chonlamaitri ...... | C23C 14/0676 |
| | | | 428/428 |
| 2018/0066142 A1* | 3/2018 | Disteldorf ........... | C03C 17/3644 |
| 2018/0257979 A1* | 9/2018 | Ding ................... | C03C 17/3644 |
| 2018/0258524 A1* | 9/2018 | Clavero ............. | C03C 17/3681 |
| 2018/0259695 A1* | 9/2018 | Ding ................... | C03C 17/3626 |
| 2019/0218140 A1* | 7/2019 | Mercadier ............... | G02B 1/11 |
| 2019/0330101 A1* | 10/2019 | Cid Aguilar ........ | C03C 17/3615 |
| 2020/0277223 A1* | 9/2020 | You ..................... | C03C 17/3644 |
| 2021/0107258 A1* | 4/2021 | Horie ...................... | B32B 15/01 |
| 2021/0340061 A1* | 11/2021 | Wanakule ......... | B32B 17/10055 |
| 2022/0017410 A1* | 1/2022 | Disteldorf ............. | C03C 17/366 |
| 2022/0342217 A1* | 10/2022 | Hagen ............... | B32B 17/10211 |
| 2023/0176374 A1* | 6/2023 | Hagen .................. | G02B 5/3066 |
| | | | 359/630 |
| 2024/0210607 A1* | 6/2024 | Hagen ............... | B32B 17/10458 |

FOREIGN PATENT DOCUMENTS

| | | | |
|---|---|---|---|
| WO | WO 2013/104439 A1 | 7/2013 | |
| WO | WO 2017/042463 A1 | 3/2017 | |
| WO | WO 2018/047037 A1 | 3/2018 | |
| WO | WO 2018/165357 A1 | 9/2018 | |

* cited by examiner

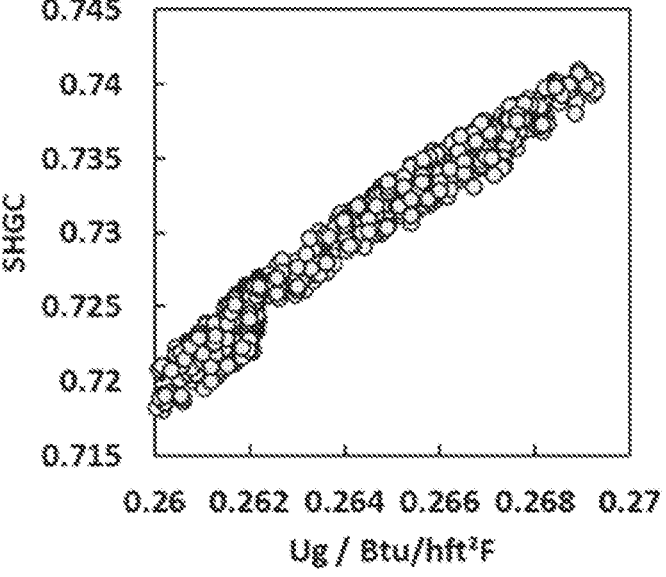

TRANSPARENT SUBSTRATE COATED WITH A STACK OF THIN LAYERS

CROSS-REFERENCE TO RELATED APPLICATIONS

This application is the U.S. National Stage of PCT/FR2022/050232, filed Feb. 9, 2022, which in turn claims priority to French patent application number 2101265 filed Feb. 10, 2021. The content of these applications are incorporated herein by reference in their entireties.

The invention relates to a transparent substrate coated with a stack of thin layers comprising a silver-based functional layer and also a glazed unit comprising such a substrate.

The invention also relates more particularly to the use of such substrates for manufacturing reinforced thermal insulation glazed units with a high solar factor. Such glazed units are for example intended for cold climates to equip buildings, in particular in order to reduce the heating effort in winter (so-called "low-emissivity" glazed units) and to maximize the free solar supply.

The solar factor SHGC is defined as the ratio between the solar energy gain entering the premises through the glazed unit and the incident solar energy. According to the NFRC 200-2017 standard, the solar energy gain is the sum of the energy flux transmitted directly through the glazed unit and the energy flux absorbed and then re-emitted toward the inside by the glazed unit.

A type of thin-layer stack known to confer such thermal insulation properties consists of a silver-based functional layer (or silver layer).

Silver-based functional layers are useful in several respects: by reflecting infrared, thermal or solar radiation, they impart on the material low-emissivity or solar control functions. Since they are electrically conducting, they also make it possible to obtain conducting materials, for example heating glazed units or electrodes.

Silver-based functional layers are deposited between coatings based on dielectric materials (hereafter known as dielectric coatings) which generally comprise several dielectric layers making it possible to adjust the optical properties of the stack and to preserve high transmission in the visible spectrum. Furthermore, these dielectric layers make it possible to protect the silver layers from chemical or mechanical attacks.

Application WO 2012/127162, belonging to the applicant, discloses a transparent substrate equipped with a stack of thin layers comprising a silver layer positioned between two particular non-metallic dielectric coatings making it possible to increase the solar factor of a glazed unit equipped with such a substrate and to obtain an acceptable coloring, in particular in transmission.

For this purpose, the stack preferably comprises:
a bottom dielectric coating, located below the silver layer, comprising at least one layer having a high refractive index, made of material having a refractive index greater than or equal to 2.20,
a top dielectric coating, located above the silver layer comprising at least the sequence of high- and low-index thin layers deposited in the following order above the silver-based layer
at least one layer having a high refractive index, made of material having a refractive index greater than or equal to 2.20, at least one layer having a low refractive index, made of material having a refractive index of less than or equal to 1.70.

Application WO 2017/42463 also belonging to the applicant, also targets coated transparent substrates making it possible to increase the solar factor of the glazed unit. The following stack is for example described in Example 1: Substrate/$Si_3N_4$/TiOx/SiZrN/ZnO/Ag/NiCr/ZnO/TiOx/$SiO_2$. The solar factor is however insufficient.

Document WO 2018/165357 (Guardian) is also known, which discloses an article coated with a low-emissivity stack, and in particular the following stack: Substrate/SiN/ZrSiN/$TiO_2$/ZnAlO/Ag/barrier $TiO_2$/ZrSiN/SiN/$SiO_2$. The ZrSiN layer must include more Zr than Si and therefore has an index close to that of the $TiO_2$ layer.

Application WO 2007/101964 discloses, in the case where the dielectric coating located below the silver layer comprises at least one dielectric layer based on nitride, in particular silicon and/or aluminum nitride, dielectric coatings comprising:
wetting layers intended to promote wetting and nucleation of the silver layer, for example a layer based on crystalline zinc oxide,
smoothing layers made of a mixed oxide located under the wetting layer contributing to the adequate growth of the silver layer above the wetting layer.

In this document, all the thin layers of the top dielectric coating, having a thickness of greater than 5 nm, have substantially equal refractive indices.

Consequently, the dielectric coatings consisting of such thin layers form a medium with a substantially homogeneous refractive index although the materials that constitute them are different.

There is strong demand for glazed unit combining the following properties:
a high light transmission, in particular of at least 70%, 75% or even 78%,
a high solar factor,
a low emissivity, and
a low heat loss resulting in low Ug coefficients.

The solar factor of the glazed unit "SF or g" is understood to mean the ratio in % of the total energy entering the premises through the glazed unit to the incident solar energy. The solar factor therefore measures the contribution of a glazed unit to the heating of the "room". The smaller the solar factor, the smaller the solar inputs.

The heat loss coefficient also referred to as "Ug value" expresses the heat flux per meter of the glazed unit caused by a temperature difference existing between the outside environment and the inside separated by the glazed unit. The lower this value, the lower the heat losses and the better the insulation.

The performance of low-emissivity glazed units is based on the compromise between the solar factor that must be maximized (solar energy input) and the value Ug that it is necessary to get as low as possible (thermal transmittance indicating the heat losses of the glazed unit).

Achieving a low solar factor and low heat loss in tandem is difficult. To achieve low heat loss, in particular with stacks having a single silver-based functional layer, the emissivity of the multilayer must be reduced without increasing the absorption or the reflection.

However, it is very difficult to reduce the emissivity without reducing the light transmission. Indeed, increasing the thickness of the silver layers makes it possible to lower the emissivity and therefore to achieve a lower thermal transmittance Ug, but this occurs at the expense of light transmission. Insofar as the reduction in light transmission also causes a reduction in the solar factor, this solution does not make it possible to maximize solar inputs.

Thus, the development of glazed units with a low Ug value and a high solar factor is essential to improving the energy efficiency of buildings incorporating these glazed units.

The applicant has discovered, surprisingly, that when the dielectric coating under the functional layer is formed of layers that form a gradient of increasing index starting from the substrate and that the dielectric coating above the functional layer is formed of layers that form a gradient of decreasing index, it is possible to increase the solar factor while retaining a low emissivity. It is then also possible to reduce the thickness of the functional layer.

The invention relates to a transparent substrate coated with a stack of thin layers as defined in the set of claims. The thin-layer stack comprises, from the substrate, a bottom dielectric coating, a silver-based functional metal layer and a top dielectric coating, each dielectric coating including several dielectric layers. The bottom dielectric coating includes a series of at least three dielectric layers having increasing refractive indices, the index difference between the three layers being at least 0.15, a smoothing layer and a wetting layer, preferably based on zinc oxide (ZnO). The top dielectric coating comprises a zinc-oxide-based layer and a series of at least two layers having decreasing refractive indices.

The solution of the invention constituted by the choice of particular dielectric layer sequences makes it possible to optimize the optical filter and to increase the conductivity of the silver. These two improvements contribute to increasing the solar factor without impacting the heat loss coefficient Ug.

The transparent substrate coated according to the invention may have the following characteristics alone or in combination:

the three dielectric layers having increasing refractive indices of the bottom dielectric coating each have a thickness of greater than 3 nm, the two dielectric layers having decreasing refractive indices of the bottom dielectric coating each have a thickness of greater than 3 nm, the smoothing layer is based on a mixed oxide comprising at least two metals chosen from tin Sn, zinc Zn, gallium Ga and indium In, preferably a mixed oxide layer based on Sn and Zn, the smoothing layer exhibits a thickness of greater than 4 nm, each dielectric coating comprises at least one high-index layer based on an oxide or nitride, having a refractive index of greater than 2.20, preferably of greater than 2.25 and a thickness of greater than 5 nm, each dielectric coating comprises at least one dielectric layer based on an oxide or nitride and having a refractive index of less than 2.15, preferably less than 2.05 and a thickness of greater than 3 nm, the top dielectric coating comprises a series of at least three layers of decreasing indices, each of a thickness greater than 5 nm, the index difference of which is greater than 0.15, or even greater than 0.20, the top dielectric coating comprises a layer with a refractive index of less than 1.70 and having a thickness of greater than 5 nm or 10 nm, the top dielectric coating includes three dielectric layers, successively of high index, medium index and low index, the medium index layer having a thickness:

greater than the thickness of the high-index layer, and greater than the thickness of the low-index layer—the bottom dielectric coating comprises:

a dielectric layer having a refractive index lower than 2.20, a dielectric layer having a refractive index of between 2.20 to 2.40, a dielectric layer having a refractive index of greater than 2.40, a smoothing layer, a wetting layer, the bottom dielectric coating comprises:

a dielectric layer having a refractive index lower than 2.20 chosen from layers based on silicon nitride, a dielectric layer having a refractive index of between 2.20 to 2.40 chosen from zirconium-silicon-nitride-based layers, preferably located in contact with the layer of silicon nitride, a dielectric layer having a refractive index greater than 2.40 chosen from layers based on oxide, preferably located in contact with the layer of zirconium silicon nitride, a smoothing layer based on zinc tin oxide, preferably located in contact with the oxide-based layer, a wetting layer based on zinc oxide, preferably located in contact with the zinc-tin-oxide-based layer, the bottom dielectric coating comprises:

a dielectric layer having a refractive index lower than 2.20 chosen from layers based on silicon nitride having a thickness of between 2 and 15 nm or between 2 and 10 nm, a dielectric layer having a refractive index of between 2.20 to 2.40 chosen from zirconium-silicon-nitride-based layers having a thickness of between 5 and 20 nm or between 10 and 20 nm, preferably located in contact with the layer of silicon nitride, a dielectric layer having a refractive index greater than 2.40 chosen from layers based on oxide, having a thickness of between 5 and 20 nm or between 10 and 20 nm, preferably located in contact with the layer of zirconium silicon nitride, a smoothing layer based on zinc tin oxide having a thickness of between 2 and 15 nm, between 3 and 10 nm or between 3 and 8 nm, preferably located in contact with the oxide-based layer, a wetting layer based on zinc oxide having a thickness of between 2 and 15 nm, between 3 and 10 nm or between 3 and 8 nm, preferably located in contact with the zinc-tin-oxide-based layer, the top dielectric coating comprises:

a zinc-oxide-based layer, a dielectric layer having a refractive index greater than 2.20, a dielectric layer having a refractive index lower than 2.20, the top dielectric coating comprises:

a zinc-oxide-based layer, a dielectric layer having a refractive index greater than 2.20, a dielectric layer having a refractive index lower than 2.20, potentially a dielectric layer having a refractive index lower than 1.70, the top dielectric coating comprises:

a zinc-oxide-based layer, a dielectric layer having a refractive index greater than 2.20 chosen from zirconium-silicon-nitride-based layers, preferably located in contact with the zinc-oxide-based layer, a dielectric layer having a refractive index lower than 2.20 chosen from layers based on silicon nitride, preferably located in contact with the zirconium silicon nitride-based layer, a dielectric layer having a refractive index lower than 1.70 chosen from layers based on silicon oxide, preferably located in contact with the silicon nitride-based layer, the top dielectric coating comprises:

a zinc-oxide-based layer having a thickness of between 2 and 15 nm, between 3 and 10 nm or between 5 and 10 nm, a dielectric layer having an refractive index greater than 2.20 chosen from zirconium-silicon-nitride-based layers having a thickness of between 5 and 40 nm, between 5 and 20 nm or between 10 and 15, preferably located in contact with the zinc-oxide-based layer, a dielectric layer having an refractive index lower than 2.20 chosen from silicon-nitride-based layers having a thickness of between 5 and 60 nm, between 5 and 50 nm, between 10 and 50 or between 20 and 40, preferably located in contact with the zirconium-silicon-nitride-based layer, a dielectric layer having an refractive index lower than 1.70 chosen from silicon-oxide-based layers having a thickness of between 5 and 150 nm, between 10 and 100 nm, or between 15 and 100, preferably located in contact with the silicon-nitride-based layer, the stack further includes an upper protective layer, the stack includes a single functional metal layer, the stack further includes a blocking layer deposited directly on the silver-based functional metal layer, the thickness of which is less than 5.0 nm, less than 4.0 nm, less than 3.0 nm, less than 2.5 nm, less than 2.0 nm, even more preferably less than 1.5 nm, the silver-based functional metal layer has a thickness between 5 and 20 nm, preferably between 6 and 10 nm and even more preferably between 7 and 8.5 nm.

According to an advantageous embodiment, the top dielectric coating comprises at least the sequence of thin layers deposited in the following order above the functional layer at least one high-refractive-index layer (hereinafter "high-index layer"), made of material having a refractive index greater than or equal to 2.20, the physical thickness of the high-refractive-index layer being between 10 and 40 nm, at least one low-refractive-index layer (hereinafter "high-index layer"), made of material having a refractive index less than or equal to 2.00, the physical thickness of the low-refractive-index layer being between 15 and 100 nm, According to an advantageous embodiment, the top dielectric coating, located above the silver-based functional metal layer, comprises:

a zinc-oxide-based layer, a high-index layer, a layer having a medium refractive index, and a layer having a refractive index lower than 2.0.

Preferably all the dielectric layers of the top dielectric coating, deposited above the zinc oxide layer, form a gradient of decreasing index.

In particular, each layer of the bottom dielectric coating having a thickness greater than 3 nm other than the wetting layer and the smoothing layer, forms a gradient of increasing index.

The stack is deposited by magnetic-field-assisted cathode sputtering (magnetron method). According to this advantageous embodiment, all the layers of the stack are deposited by magnetic-field-assisted cathode sputtering.

The invention also relates:

to a glazed unit according to the invention mounted on a vehicle or on a building, and to the method for preparing a laminated glazed unit according to the invention, to the use of a laminated glazed unit according to the invention as solar-control glazed unit for buildings or vehicles, to a building or vehicle comprising a glazed unit according to the invention.

The preferred features which appear in the remainder of the description are applicable as well to the substrate according to the invention as, where appropriate, to the glazed unit, the method, the use, the building or the vehicle according to the invention.

All the described light features are obtained according to the principles and methods of the ISO 9050 standard relating to the determination of the light and solar features of the glazed units used in glass for the construction industry.

Conventionally, the refractive indices are measured at a wavelength of 550 nm.

According to the invention, two elements such as layers or substrates have substantially equal refractive indices when the absolute value of the difference between the refractive indices of the two materials constituting said layers or substrates at 550 nm is less than or equal to 0.15.

According to the invention, layers are considered to have different refractive indices when the absolute value of the difference between the refractive indices measured at 550 nm of the two materials constituting them is greater than or equal to 0.15, greater than or equal to 0.25, greater than 0.30, greater than 0.40, greater than 0.50, greater than 0.60, greater than 0.70 or greater than 0.80.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or several) layer(s) inserted between these two layers (or layer and coating).

In the present description, unless otherwise indicated, the expression "based on", used to characterize a material or a layer with respect to what it contains, means that the mass fraction of the constituent that it comprises is at least 50%, in particular at least 70%, preferably at least 90%.

Thus, the total optical thickness of the antireflective coating consists of the sum of all the optical thicknesses of the dielectric layers constituting this coating.

The stack is deposited by magnetic-field-assisted cathode sputtering (magnetron method). According to this advantageous embodiment, all the layers of the stack are deposited by magnetic-field-assisted cathode sputtering.

Unless otherwise mentioned, the thicknesses alluded to in the present document are physical thicknesses and the layers are thin layers. Thin layer is understood to mean a layer having a thickness of between 0.1 nm and 100 micrometers.

Throughout the description, the substrate according to the invention is regarded as laid horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or a coating, this means that there cannot be one or more layers inserted between these two layers.

The silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, relative to the weight of the silver-based functional metal layer.

In particular, the silver-based functional metal layer has a thickness between 5 and 20 nm, preferably between 6 and 10 nm and even more preferably between 7 and 8.5 nm. The silver-based functional metal layers have a thickness:

greater than 5 nm, 6, nm, 7 nm, 8 nm, 9, nm, 10 nm, 11 nm, 12 nm, 13 nm, 14 nm, 15 nm or 16 nm, and/or less than 25 nm, 22 nm, 20 nm, 18 nm.

The stack may also further include a blocking layer deposited directly on the silver-based functional metal layer, According to this embodiment, the blocking layer is chosen from metal layers, metal nitride layers, metal oxide layers and metal oxynitride layers based on one or more elements chosen from niobium Nb, tantalum Ta, titanium Ti, chromium Cr or nickel Ni or based on an alloy obtained from at least two of these metals. When these blocking layers are deposited in the metal, nitride, oxynitride, or sub-oxidized form, these layers can undergo a partial or complete oxidation according to their thickness and the nature of the layers which surround them, for example, during the deposition of the following layer or by oxidation in contact with the underlying layer.

The blocking layers are chosen from:

metal layers based on a metal or a metal alloy, metal nitride layers, and metal oxynitride layers of one or more elements chosen from titanium, zinc, tin, nickel, chromium and niobium, metal oxide layers of one or more elements chosen from titanium, nickel, chromium and niobium.

The blocking layers may in particular be, as deposited, Ti, TiN, TiOx, Nb, NbN, Ni, NiN, Cr, CrN, NiCr, NiCrOx, NiCrN, SnZnN layers.

Preferably, the blocking layers are based on titanium and are metallic layers or metal oxide layers, preferably, oxygen-substoichiometric.

According to an advantageous embodiment, the stack does not comprise a blocking layer located below and in contact with the silver-based functional metal layer.

The thickness of the blocking layer is generally between 0.1 and 5.0 µm, preferably:

at least 0.1 nm or at least 0.5 nm and/or at most 5.0 nm, or at most 2.0 nm, at most 1.0 nm.

The dielectric coatings comprise dielectric layers. "Dielectric layer" within the meaning of the present invention should be understood as meaning that, from the perspective of its nature, the material is "nonmetallic", that is, is not a metal. In the context of the invention, this term denotes a material having an n/k ratio, over the whole visible wavelength range (from 380 nm to 780 nm) of equal to or greater than 5. n denotes the real refractive index of the material at a given wavelength and k represents the imaginary part of the refractive index at a given wavelength: the ratio n/k being calculated at a given wavelength which is identical for n and for k.

The thickness of a dielectric coating corresponds to the sum of the thicknesses of the layers constituting it. Preferably, the dielectric coatings have a thickness greater than 10 nm, greater than 15 nm, between 15 and 200 nm, between 15 and 100 nm or between 15 and 70 nm.

For the purposes of the invention, "total optical thickness" means the sum of all the optical thicknesses of the layers considered, each optical thickness being, as explained above, the product of the physical (or real) thickness of the layer with its refractive index measured at 550 nm.

The dielectric layers of the coatings exhibit the following characteristics, alone or in combination:

they are deposited by sputtering assisted by a magnetic field, they are selected from the oxides, nitrides, or oxynitrides of one or more elements chosen from titanium, silicon, aluminum, zirconium, tin and zinc, they have a thickness generally greater than or equal to 1 nm, greater than 2 nm, preferably between 4 and 200 nm, preferably between 5 and 100 nm.

The dielectric layers, in addition to their optical function, may have different other functions. By way of example, mention may be made of stabilizing layers, smoothing layers, and barrier layers.

Among the dielectric layers, a distinction is made, according to their refractive index at 550 nm, between low-refractive-index layers, medium-refractive-index layers and high-refractive-index layers. The low-refractive-index layers have a refractive index of less than 2.00, preferably less than 1.70. The medium-refractive-index layers have a refractive index of between 2.0 and 2.2. The high-refractive-index layers have a refractive index greater than 2.2.

Wetting layer is understood to mean a layer made of a material capable of stabilizing the interface with the functional layer. The wetting layers are based on zinc oxide, optionally be doped by means of at least one other element, such as aluminum. The zinc oxide is crystallized. The layer based on zinc oxide comprises, in increasing order of preference, at least 90.0%, at least 92%, at least 95%, at least 98.0% by mass of zinc relative to the mass of elements other than oxygen in the zinc oxide-based layer.

The wetting layers have, in increasing order of preference, a thickness of:

at least 3.0 nm, at least 5.0 nm, and/or at most 25 nm, at most 10 nm, at most 8.0 nm.

The wetting layer may be directly in contact with the silver-based functional metal layer.

Smoothing layer is understood to mean a layer, the function of which is to promote the growth of the wetting layer along a preferred crystallographic orientation which promotes the crystallization of the silver layer by epitaxy phenomena. The smoothing layer is located below and preferably in contact with a wetting layer.

The smoothing layer based on mixed oxide can be described as "noncrystalline" in the sense that it can be completely amorphous or partially amorphous. The smoothing layer is not completely crystalline, over its entire thickness. It cannot be of metal nature as it is based on a mixed oxide (a mixed oxide is an oxide of at least two elements).

The advantage of such a smoothing layer is to make it possible to obtain an interface with the wetting layer which is not very rough. This low roughness can be observed with a transmission electron microscope. Furthermore, the wetting layer gains texture better and also has a more pronounced preferential crystallographic orientation.

Each smoothing layer is thus made of a different material, both from the crystallographic point of view and the stoichiometric point of view, from that of the wetting layer under which it is directly positioned.

Preferably, the smoothing layer is a layer based on mixed oxide of at least two metals chosen from Sn, Zn, In, and Ga. A preferred mixed oxide is zinc tin oxide. The smoothing layer is preferably a mixed layer of zinc and tin oxide, which is optionally doped.

The index of the smoothing layer is preferably less than 2.2. Furthermore, the smoothing layer preferably exhibits a thickness of between 0.1 and 30 nm and more preferably of between 0.2 and 10 nm.

The smoothing layers have, in increasing order of preference, a thickness of:

at least 0.5 nm, at least 1.0 nm, and/or at most 25 nm, at most 15 nm, at most 10 nm, at most 8 nm.

The wetting layer is advantageously directly in contact with the silver-based metal layer. This means that, in this case, the stack does not comprise a blocking layer under the silver-based functional layer.

The top dielectric coating further includes a zinc-oxide-based layer (ZnO) arranged between the silver-based functional metal layer and the series of at least two layers having decreasing indices.

In particular, each dielectric coating may comprise at least one high-index layer based on an oxide or nitride, having a refractive index of greater than 2.20, preferably greater than 2.25 and preferably having a thickness of greater than 5 nm.

The high-refractive-index layers may have a refractive index:

greater than 2.25, greater than 2.30, greater than 2.35, or greater than 2.40, less than 2.60, less than 2.50, less than 2.40.

The high-index layer based on metal oxide may be chosen from layers based on oxides or nitrides of titanium, zirconium, niobium or an alloy of metals chosen from the group consisting of Zn, Zr, Sn, Si, and Al.

The high-refractive-index layers can be chosen from:

the layers based on titanium oxide (n550=2.4), the layers based on mixed oxide of titanium and another component selected from the group consisting of Zn, Zr and Sn, the layers based on a zirconium nitride layer (n 550=2.55), the zirconium-silicon-nitride-based layers (n550 nm=2.20-2.40), the layers based on a layer of zirconium oxide, the layers based on manganese oxide MnO (n550=2.16), the layers based on a layer of tungsten oxide (n550=2.15), the layers based on a layer of niobium oxide (n550=2.30), the layers based on a layer of bismuth oxide (n 550=2.60), The thickness of the high-index layer is, by increasing order of preference, comprised between 5 and 100 nm, between 8 and 40 nm, between 10 and 30 nm, between 15 and 25 nm.

In particular, each dielectric coating comprises at least one dielectric layer based on an oxide or nitride and having a refractive index of less than 2.20, preferably less than 2.15 and preferably less than 2.05 nm, These layers may have a thickness of greater than 3 nm. Such layers are medium-refractive-index layers.

The low-index layers may have a refractive index of less than 1.70, less than 1.6 or less than 1.5. The low-refractiveindex layers are preferably silicon-oxide-based layers. The silicon-oxide-based layers preferably consist of more than 80% by weight of silicon oxide based on the simple oxide formulation $SiO_2$ and optionally at least one other element preferably selected from the group consisting of Al, C, N, B, Sn, Zn and very preferably from Al, B or C. Preferably, said layers consisting essentially of silicon oxide consist of more than 90% by weight of silicon oxide, based on the simple oxide formulation $SiO_2$.

According to an advantageous embodiment, the top dielectric coating includes three dielectric layers, successively a high-index layer, a medium-index layer and a low-index layer; the medium-index layer having a thickness:

greater than the thickness of the high-index layer, and greater than the thickness of the low-index layer.

The stack of thin layers may comprise just one functional layer.

An example of a suitable stack according to the invention comprises, starting from the substrate, the following features, alone or in combination:

a bottom dielectric coating comprising:

three layers of increasing index with an index difference between each successive layer of at least 0.15, preferably of at least 0.20;

2 to 15 nm, preferably 3 to 10 nm of a layer having an index of between 1.45 and 2.00;

5 to 30 nm, preferably 10 to 20 nm of a layer having an index of between 1.80 and 2.30;

5 to 30 nm, preferably 10 to 20 nm of a layer having an index of between 2.20 and 2.50;

a smoothing layer of 2 to 10 nm, preferably of 3 to 8 nm;

a wetting layer of 2 to 10 nm, preferably of 3 to 8 nm;

a silver-based functional metal layer of 6 to 10 nm, preferably of 7 to 8.5 nm.

a blocking layer of 0.2 to 3 nm, preferably of 0.5 to 2.5 nm;

a top dielectric coating, including:

a ZnO layer of 4 to 15 nm, preferably of 5 to 10 nm;

three layers of decreasing index with an index difference between each successive layer of at least 0.15, preferably of at least 0.20;

5 to 20 nm, preferably 10 to 15 nm of a layer having an index of between 2.20 and 2.50;

5 to 50 nm, preferably 10 to 40 nm of a layer having an index of between 1.80 and 2.30;

10 to 100 nm, preferably 15 to 80 nm of a layer having an index of between 1.45 and 2.00;

optionally a protective layer, for example based on 0.2 to 5 nm, preferably from 0.5 to 3 nm of TiOx or SnZnO.

Advantageously:

the silver-based functional metal layer is located above and in contact with the wetting layer, and/or the wetting layer is located above and in contact with the smoothing layer, and/or the smoothing layer is located above and in contact with a high-index layer The stack of thin layers can optionally comprise a protective layer. The protective layer is preferably the final layer of the stack, that is to say the layer furthest from the substrate coated with the stack (before heat treatment). These layers generally have a thickness of between 0.5 and 10 nm, preferably 1 and 5 nm. This protective layer can be chosen from a layer of titanium, zirconium, hafnium, zinc and/or tin, this or these metals being in the metal, oxide or nitride form.

According to one embodiment, the protective layer is based on zirconium and/or titanium oxide, preferably based on zirconium oxide or titanium zirconium oxide.

The transparent substrates according to the invention are preferably made of a rigid inorganic material, such as made of glass, or are organic, based on polymers (or made of polymer).

The organic transparent substrates according to the invention can also be made of polymer, and are rigid or flexible. Examples of polymers which are suitable according to the invention comprise, especially:

polyethylene, polyesters, such as polyethylene terephthalate (PET), polybutylene terephthalate (PBT), polyethylene naphthalate (PEN);

polyacrylates, such as polymethyl methacrylate (PMMA);

polycarbonates;

polyurethanes;

polyamides;

polyimides;

fluorinated polymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE), fluorinated ethylene-propylene copolymers (FEP);

photocrosslinkable and/or photopolymerizable resins, such as thiolene, polyurethane, urethane-acrylate, polyester-acrylate resins, and polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, even 2 m and even 3 m. The thickness of the substrate generally varies between 0.5 mm and 19 mm, preferably between 0.7 and 9 mm, especially between 2 and 8 mm. The substrate may be flat or curved.

In a double glazed unit (DGU), using a second substrate (backing-glass) with a low iron content, with the same stack, the solar factor may also be slightly increased. Likewise, with a glass substrate of the extra-clear type, the solar factor is increased even further.

The invention also relates to a multiple glazed unit, in particular a laminated glazed unit, or double glazed unit or triple glazed unit, including at least two transparent substrates, at least one of which is according to the description above.

In a multiple glazed unit, the faces are counted starting from the outside of the building towards the inside of the building. In a double glazed unit, Faces 2 and 3 are on the interior of the double glazed unit.

Preferably, the multiple glazed unit has, in a 3/12/3 configuration, with the interlayer space filled with a mixture 90% argon and 10% air and the layer on Face 3, a solar factor (SHGC) greater than 0.65, preferably greater than 0.70, and even more preferably greater than 0.72.

In this same configuration, the glazed unit preferably has a Ug coefficient of less than 0.36, preferably less than 0.34 and even more preferably less than 0.32.

In particular, at least one of the substrates is made of glass, in particular soda-lime-silica glass, comprising a reduced iron content.

Furthermore, these materials can be incorporated in glazed units that furthermore exhibit specific functionalities, such as, for example, heated glazed units.

The invention also relates to a method for obtaining a material comprising a transparent substrate coated with a stack of thin layers according to the invention.

The coated substrate of the invention is suitable in all applications requiring the use of a low-emissivity stack comprising silver layers for which a high solar factor, a low emissivity and good light transmission are key parameters.

The examples which follow illustrate the invention without, however, limiting it.

EXAMPLES

I. Nature of the Deposited Layers and Coatings

Several types of stacks of thin layers defined below are deposited on substrates made of clear soda-lime glass with a thickness of 2.9 mm, in a known manner, on a cathode sputtering line (magnetron process) in which the substrate runs under different targets.

For these examples, the conditions of deposition of the layers deposited by sputtering ("magnetron cathode" sputtering) are summarized in Table 1 below.

TABLE 1

| | Targets employed | Deposition pressure | Gas | Index |
|---|---|---|---|---|
| $Si_3N_4$ | Si:Al (92:8% by wt) | $2\text{-}15*10^{-3}$ mbar | Ar 47% - $N_2$ 53% | 1.98 |
| SiZrAlN | Si:Al:Zr (70:8:22 at. %) | $2$ to $4.10^{-3}$ mbar | Ar 40-55% - $N_2$ 45-60% | 2.26 |
| SnZnOx | Sn:Zn (60:40% by wt) | $1.5*10^{-3}$ mbar | Ar 40-60% - $O_2$ 40-60% | 2.09 |
| Zno | Zn:Al (98:2% by wt) | $1.5*10^{-3}$ mbar | Ar 60% - $O_2$ 40% | 2.04 |
| Ag | Ag | $5$ to $8*10^{-3}$ mbar | Ar at 100% | — |
| Ti | Ti | $3*10^{-3}$ mbar | Ar at 100% | — |
| $SiO_2$ | Si:Al (92:8% by wt) | $2\text{-}5*10^{-3}$ mbar | Ar 100% - $O_2$ 45-60% | 1.50 |
| $TiO_2$ | TiOx | $1.5.10{-3}$ mbar | Ar 88% - O2 12% | 2.45 | at.: atomic; wt: weight; Index: at 550 nm.

13

Tables 2 and 3 indicate for each coated substrate the physical thickness of the layers of the stack, expressed in nm (unless otherwise indicated). The first row corresponds to the film furthest away from the substrate, that is in contact with the open air.

TABLE 2

| Table 2 | | | | |
|---|---|---|---|---|
| | | Comp. 1 | Comp. 2 | Comp.3 |
| Protective layer | $TiO_x$ | 1 | 1 | 1 |
| Low-index layer | $SiO_2$ | — | — | — |
| Medium-index layer | $SiN_x$ | — | — | — |
| High-index layer | $SiZrN_x$ | 41 | 45 | 44 |
| | ZnO | 8 | 8 | 8 |
| Blocking layer | $TiO_x$ | 1 | 1 | 1 |
| Functional layer | Ag | 8 | 8 | 8 |
| Wetting layer | ZnO | 5 | 5 | 5 |
| Smoothing layer | SnZnO | — | — | 5 |
| High-index layer | $TiO_x$ | — | 13 | 13 |
| Medium-index layer | $SiZrN_x$ | 20 | 7 | 10 |
| Low-index layer | $SiN_x$ | 22 | 16 | 4 |
| substrate | | | | |
| SHGC (%) | — | 71.9 | 72.3 | 72.4 |

TABLE 3

| Table 3 | | | | | | | |
|---|---|---|---|---|---|---|---|
| | | Ex. 1 | Ex. 2 | Ex. 3 | Ex. 4 | Ex. 5 | Comp. 6 |
| Protective layer | $TiO_x$ | 1 | 1 | 1 | 1 | 1 | 1 |
| Low-index layer | $SiO_2$ | / | 7 | 15 | 46 | 15 | 15 |
| Medium-index layer | $SiN_x$ | 29 | 27 | 22 | 15 | 22 | 22 |
| High-index layer | $SiZrN_x$ | 14 | 14 | 14 | 14 | 14 | 14 |
| | ZnO | 8 | 8 | 8 | 8 | 8 | 8 |
| Blocking layer | $TiO_x$ | 1 | 1 | 1 | 1 | 1 | 1 |
| Functional layer | Ag | 8 | 8 | 8 | 8 | 8 | 8 |
| Wetting layer | ZnO | 5 | 5 | 5 | 5 | 5 | 5 |
| Smoothing layer | SnZnO | 5 | 5 | 5 | 5 | 2 | 0 |
| High-index layer | $TiO_x$ | 13 | 13 | 13 | 13 | 13 | 13 |
| Medium-index layer | $SiZrN_x$ | 14 | 14 | 14 | 14 | 14 | 10 |
| Low-index layer | $SiN_x$ | 4 | 4 | 4 | 4 | 4 | 12 |
| substrate | | | | | | | |
| SHGC (%) | — | 72.7 | 72.8 | 72.9 | 73.6 | 72.7 | 72.5 |
| Rsq (ohms/ square) | — | 7.04 | 7.04 | 7.04 | — | 7.15 | 7.21 |

In the bottom dielectric coating, the layers $SiN_x$, $SiZrN_x$, $TiO_x$ have respective indices of 1.98, 2.26 and 2.45, that is, increasing.

In the top dielectric coating, the layers $SiZrN_x$, $SiN_x$, $SiO_2$ have respective indices of 2.26, 1.98 and 1.50, that is, decreasing.

II. Configuration of the Double Glazed Units

The substrates coated with the stack were assembled as a double glazed unit, in a 3/12/3 configuration, with a second substrate (called backing-glass) made of clear soda-lime glass, placed on the outside of the building; the coated substrate being placed on the inside of the building with the layer on Face 3. The interlayer space is filled with a 90% argon and 10% air mixture.

III. Optical Performance

The following characteristics were measured on the double glazed unit configurations and are given in Table 2:

the solar factor: SHGC (Solar Heat Gain Coefficient) according to the NFRI 200-2017 standard,
the sheet resistance (Rsq) (in Ω/square). This value is linked linearly to the emissivity value.

The coefficient Ug is deduced from the emissivity.

0.2 points of percentage of solar factor constitutes a significant improvement.

Comparing the glazed units Comp.1 and Comp.2 shows that the use in the bottom dielectric coating of a sequence of at least 3 layers of increasing refractive index (Comp.2) vs 2 layers of increasing refractive index (Comp.1) allows an increase in the solar factor of 0.4% percentage.

The use of a smoothing layer in the dielectric coating further improves the solar factor (comp.3 vs comp.2).

The combined use of at least three layers having an gradient of increasing index. in the bottom dielectric coating and at least two layers having a gradient of decreasing index in the top dielectric coating allows an increase in the solar factor of 0.8 percentage point (m.1 vs Inv.1).

The combined use of at least three layers having an gradient of increasing index. in the bottom dielectric coating and at least three layers having a gradient of decreasing index in the top dielectric coating allows an increase in the solar factor of 0.9 to 1.7 percentage point (comp.1 vs Inv.2, Inv.3 and Inv.4).

Finally, examples Inv.3, Inv.5 and Comp.6 demonstrate the influence of a smoothing layer based on SnZnO in the bottom dielectric coating. There is another gain in solar factor, but most importantly a decrease in sheet resistance.

FIG. 1 shows the relationship between the solar factor SHGC and the thermal insulation coefficient Ug for the different simulations according to the invention. The coefficient Ug varies from 0.22 to 0.31 Btu/hft$^2$F when the solar factor SHGC varies from 0.720 to 0.757.

In the same double glazed unit configuration, with the stack according to example 3 on face 3, if the clear soda-lime glass backing is replaced with a glass having a low iron content, the solar factor changes from 72.9 to 74.2, and if the backing glass is replaced with an extra clear glass, the solar factor changes to 75.7.

In the same double glazed unit configuration, with the stack according to example 3 on Face 3, with the Argon-air 90-10 mixture, the Ug coefficient is 0.263. If the mixture is replaced by:

100% air, the coefficient Ug changes to 0.311,
100% Argon, the coefficient Ug changes to 0.258,
100% Krypton, the coefficient Ug changes to 0.242,
100% Xenon, the coefficient Ug changes to 0.226, It is therefore demonstrated that the Ug coefficient depends greatly on the composition of the gas filling the cavity of the double glazed unit.

The invention claimed is:

1. A transparent substrate coated with a stack of thin layers having a single silver-based functional metal layer, said stack of thin layers comprising, starting from the substrate, a bottom dielectric coating, said silver-based functional metal layer and a top dielectric coating, each dielectric coating comprising several dielectric layers, wherein:

the bottom dielectric coating is in contact with the substrate and comprises, starting from the substrate:

a series of at least three dielectric layers having increasing refractive indices, a smoothing layer and a wetting layer, wherein a refractive index difference between each pair of successive layers of the series of at least three dielectric layers having increasing refractive indices is at least 0.15, the top dielectric coating comprises, in a direction moving away from the substrate:

a zinc-oxide-based layer and a series of at least two layers having decreasing refractive indices, a refractive index difference between each pair of successive layer of the series of at least two layers having decreasing refractive indices being at least 0.15, said series of at least two layers having decreasing refractive indices being in direct contact with the zinc-oxide-based layer.

2. The transparent substrate according to claim 1, wherein the at least three dielectric layers having increasing refractive indices of the bottom dielectric coating each have a thickness of greater than 3 nm.

3. The transparent substrate according to claim 1, wherein the at least two dielectric layers having decreasing refractive indices of the top dielectric coating each have a thickness of greater than 3 nm.

4. The transparent substrate according to claim 1, wherein the smoothing layer is based on a mixed oxide comprising at least two metals chosen from tin (Sn), zinc (Zn), gallium (Ga) and indium (In).

5. The transparent substrate according to claim 4, wherein the smoothing layer is a mixed oxide layer based on Sn and Zn.

6. The transparent substrate according to claim 1, wherein the series of at least two layers having decreasing refractive indices of the top dielectric coating comprises a succession of at least three layers of decreasing refractive indices, each of a thickness greater than 5 nm, a refractive index difference between each pair of the succession of the at least three layers of decreasing refractive indices is greater than 0.15.

7. The transparent substrate according to claim 6, wherein the index difference is greater than 0.20.

8. The transparent substrate according to claim 1, wherein the series of at least two layers having decreasing refractive indices of the top dielectric coating comprises a layer with a refractive index of less than 1.70 and having a thickness of greater than 5 nm or 10 nm.

9. The transparent substrate according to claim 1, wherein the bottom dielectric coating comprises:
   a dielectric layer having a refractive index lower than 2.20 chosen from the layers based on silicon nitride,
   a dielectric layer having a refractive index of between 2.20 to 2.40 chosen from the zirconium-silicon-nitride-based layers,
   a dielectric layer having a refractive index greater than 2.40 chosen from layers based on oxide,
   a smoothing layer based on zinc tin oxide, and
   a wetting layer based on zinc oxide.

10. The transparent substrate according to claim 9, wherein the dielectric layer having a refractive index of between 2.20 to 2.40 chosen from the zirconium-silicon-nitride-based layers is in contact with the layer of silicon nitride, wherein the dielectric layer having a refractive index greater than 2.40 chosen from layers based on oxide is in contact with the layer of zirconium silicon nitride, wherein the smoothing layer based on zinc tin oxide is in contact with the oxide-based layer, and wherein the wetting layer based on zinc oxide is in contact with the zinc-tin-oxide-based layer.

11. The transparent substrate according to claim 1, wherein the top dielectric coating comprises:
   the zinc-oxide-based layer,
   a dielectric layer having a refractive index greater than 2.20,
   a dielectric layer having a refractive index lower than 2.20,
   optionally a dielectric layer having a refractive index lower than 1.70.

12. The transparent substrate according to claim 1, wherein the top dielectric coating comprises:
   the zinc-oxide-based layer,
   a dielectric layer having a refractive index greater than 2.20 chosen from zirconium-silicon-nitride-based layers,
   a dielectric layer having a refractive index lower than 2.20 chosen from the layers based on silicon nitride,
   a dielectric layer having a refractive index lower than 1.70 chosen from the layers based on silicon oxide.

13. The transparent substrate according to claim 12, wherein the dielectric layer having a refractive index greater than 2.20 chosen from zirconium-silicon-nitride-based layers is in contact with the zinc-oxide-based layer, wherein the dielectric layer having a refractive index lower than 2.20 chosen from the layers based on silicon nitride is in contact with the zirconium silicon nitride-based layer, and wherein the dielectric layer having a refractive index lower than 1.70 chosen from the layers based on silicon oxide is in contact with the silicon nitride-based layer.

14. The transparent substrate according to claim 1, wherein the stack further includes a blocking layer deposited directly on the silver-based functional metal layer, a thickness of which is less than 5.0 nm.

15. The transparent substrate according to claim 1, wherein the wetting layer is a zinc oxide layer.

16. The transparent substrate according to claim 1, wherein the silver-based functional metal layer has a thickness between 5 and 20 nm.

17. A multiple glazed unit including at least two transparent substrates, at least one of which is according to claim 1.

18. The multiple glazed unit according to claim 17, wherein the multiple glazed unit has, in a 3/12/3 configuration, with the interlayer space filled with a mixture 90% argon and 10% air and the stack of thin layers on Face 3, a solar factor (SHGC) greater than 0.65.

19. The multiple glazed unit according to claim 18, wherein the multiple glazed unit has, in a 3/12/3 configuration, with the interlayer space filled with a mixture 90% argon and 10% air and the stack of thin layers on Face 3, a coefficient Ug less than 0.36.

20. The multiple glazed unit according to claim 18, at least one of the at least two transparent substrates is made of glass including a reduced iron content.

* * * * *